(12) United States Patent
Ito et al.

(10) Patent No.: US 7,333,713 B1
(45) Date of Patent: Feb. 19, 2008

(54) INFORMATION RECORDING APPARATUS AND METHOD, AND INFORMATION RECORDING MEDIUM ON WHICH INFORMATION IS RECORDED BY USING THEM

(75) Inventors: Masanori Ito, Moriguchi (JP); Masafumi Shimotashiro, Katano (JP); Makoto Mitsuda, Ibaraki (JP); Tadashi Nakamura, Nara (JP); Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1162 days.

(21) Appl. No.: 10/130,920

(22) PCT Filed: Nov. 28, 2000

(86) PCT No.: PCT/JP00/08379

§ 371 (c)(1),
(2), (4) Date: May 24, 2002

(87) PCT Pub. No.: WO01/41434

PCT Pub. Date: Jun. 7, 2001

(30) Foreign Application Priority Data

Dec. 1, 1999 (JP) ................................. 11-342567

(51) Int. Cl.
*H04N 5/91* (2006.01)
*H04B 5/76* (2006.01)

(52) U.S. Cl. ............................ 386/68; 386/69; 386/70; 386/95; 386/109; 348/231

(58) Field of Classification Search .................. 386/48, 386/109, 69, 70, 95, 125, 126, 120; 370/84, 370/60; 348/231; 358/909.1, 906
See application file for complete search history.

(56) References Cited

U.S. PATENT DOCUMENTS

| | | | | |
|---|---|---|---|---|
| 5,648,960 A | * | 7/1997 | Sakazaki et al. | 370/498 |
| 5,742,728 A | * | 4/1998 | Yanagihara et al. | 386/68 |
| 5,960,152 A | * | 9/1999 | Sawabe et al. | 386/98 |
| 5,966,495 A | * | 10/1999 | Takahashi et al. | 386/68 |

FOREIGN PATENT DOCUMENTS

| | | |
|---|---|---|
| JP | 8-195035 | 7/1996 |
| JP | 9-74547 | 3/1997 |
| JP | 10-262218 | 9/1998 |

* cited by examiner

*Primary Examiner*—John Miller
*Assistant Examiner*—Jamie Vent
(74) *Attorney, Agent, or Firm*—Hamre, Schumann, Mueller & Larson, P.C.

(57) ABSTRACT

In a disk camera, when additional information and moving picture information are managed as one file and recorded on an optical disk, useless area is minimized, thereby allowing effective use of recording capacity. A recording controlling part records continuously with respect to a logical block of the optical disk, at least one of input video and audio information in a packet format of a fixed length that is different from a data size of the logical block, and creates a data file for recording with respect to the logical block, additional information with respect to the video or audio information in the packet format of the fixed length. In this one data file, a fixed data size portion of the additional information is arranged in an area ahead of an area in which the video and audio information are arranged, and a variable data size portion of the additional information is arranged in an area behind the area in which the video and audio information are arranged.

12 Claims, 12 Drawing Sheets

INFORMATION RECORDING APPARATUS AND METHOD, AND INFORMATION RECORDING MEDIUM ON WHICH INFORMATION IS RECORDED BY USING THEM

TECHNICAL FIELD

The present invention relates to an information recording apparatus and an information recording method for recording video and audio information in real time on a recording medium such as an optical disk by compression according to an MPEG standard, and an information recording medium on which information is recorded by using the apparatus and the method.

BACKGROUND ART

A digital still camera is representative of cameras for recording video images on a random-accessible recording medium. In a dominant configuration of the digital still cameras, both one still picture image and additional information of the still picture image are recorded as one file in a memory card.

The following advantage can be provided by this configuration in which both one still picture image and additional information of the still picture image are recorded as one file. That is, when a camera is connected to a personal computer through a digital interface such as a USB and accessed as a drive from the personal computer, file handling is made more convenient. Suppose that a still picture image and additional information of the still picture image are recorded as two separate files. For example, when copying a plurality of still picture images, the number of files to be copied is doubled compared with the case where the still picture image and the additional information are recorded as one file. Similarly, when deleting a plurality of still picture images, the number of files to be deleted is doubled. Thus, when a still picture image and additional information of the still picture image are recorded as one file, file handling on a personal computer is made easier.

Additional information to be recorded by the digital still camera includes attribute information such as a shooting date and time, and a thumbnail image of 160 by 120 pixels. In each file, the additional information is arranged ahead of a still picture image. Further, since the additional information as well as the still picture image is inserted in a format complying with a JPEG standard, the whole file also complies with the JPEG standard.

Meanwhile, a camera referred to as a disk movie is an example of cameras for recording moving pictures on a random-accessible recording medium. In the disk movie, a moving picture is recorded in a format of an MPEG transport stream on an optical disk, and additional information is recorded ahead of an area in which the moving picture has been recorded, so that the moving picture and the additional information can be handled as one file.

According to an MPEG standard, a video stream (video data) and an audio stream (audio data) are divided into packets in units of 188 bytes, and each packet is referred to as a transport packet. Further, a mixed arrangement of a video transport packet and an audio transport packet is referred to as an MPEG transport stream.

Additional information with respect to a video image can be stored, for example, in a private stream (private data) according to the MPEG standard, which is one of structures for storing self data. The private stream is divided into packets in units of 188 bytes to create transport packets, and the transport packets are arranged ahead of a transport stream of a moving picture. A transport stream with the additional information arranged at the front thus can be configured.

FIG. 7 shows a packet structure of a moving picture file in a conventional disk camera. In FIG. 7, a P_TSP represents a transport packet of a private stream containing additional information. Further, a V_TSP and an A_TSP represent a transport packet of a video stream and a transport packet of an audio stream, respectively. The V_TSPs and the A_TSPs are configured in the order defined in the MPEG standard and arranged. Further, a N_TSP represents a null transport packet containing no meaningful information. Further, a PAT and a PMT represent a transport packet containing a Program Association Table and a transport packet containing a Program Map Table, respectively. These two packets are essential in an MPEG transport stream.

These types of transport packets are discriminated from each other by a PID number arranged in a transport packet header portion as shown in FIG. 8. Further, in a payload portion following the transport packet header portion, the private stream, the video stream, or the audio stream is arranged.

FIG. 9 shows an example of a data structure in which the additional information is composed of attribute information such as a shooting date and time, and five thumbnail images. A plurality of the null transport packets, i.e. the N_TSPs, are arranged between the additional information and moving picture information. These N_TSPs need to be arranged so that when the additional information has a data size that is not a multiple of 94 kbytes, compliance with the rules defined in a UDF standard that will be described later is attained, and continuity of the transport packets is secured. In order to meet these two conditions, it is necessary to arrange the N_TSPs continuously until the last byte ($188^{th}$ byte) of the N_TSP and the last byte ($2,048^{th}$ byte) of 2 kbytes coincide with each other for the first time.

Accordingly, one continuous chunk of the N_TSPs has a minimum length of 0 byte and a maximum length obtained by subtracting 188 bytes from 94 kbytes (94 by 1,024 bytes), which is the lowest common multiple of 188 bytes and 2,048 bytes. In actual recording, the length of additional information determines the length of one continuous chunk of the N_TSPs.

FIG. 10 is a block diagram showing the configuration of a conventional disk camera. As shown in FIG. 10, in recording, signals input from a video signal input part 1001 and an audio signal input part 1002 are compressed in a video compressing part 1003 and an audio compressing part 1004, respectively. Based on the video signal and the audio signal that have been compressed, a transport stream assembling part 1005 creates a video and audio transport stream in which the V_TSPs and the A_TSPs are configured in the order defined in the MPEG standard. The created video and audio transport stream is transmitted via a recording part 1006 and a pickup 1007 and written on a phase change optical disk 1008. In reproduction, the video and audio transport stream extracted via the pickup 1007 and a reproducing part 1009 is separated into a video signal and an audio signal in a transport stream disassembling part 1010. The video signal and the audio signal that are obtained by the separation are expanded in a video expanding part 1011 and an audio expanding part 1012, respectively. Then, the video signal and the audio signal are output to a video displaying part 1013 and an audio output part 1014, respectively.

A recording controlling part 1015 creates, in each recording operation by a user, one moving picture file complying with a UDF (Universal Disk Format Specification, Optical Storage Technology Association) file system regarding transport stream structures on the phase change optical disk 1008. Further, the recording controlling part 1015 manages a status of use of a recording area in units of a 2-kbyte logical sector.

A reproduction controlling part 1016 controls operations such as the continuous reproduction of a plurality of files.

A thumbnail image generating part 1017 extracts one field of video signals at 1-minute intervals, subjects the video signals to JPEG compression, and stores the result of the compression in memory.

FIG. 11 shows how one file is managed using the UDF file system as an example. The file is composed of an FID (File Identification Descriptor), a file entry, and file actual data. Address information of the file entry is referred to from an ICB (Information Control Block) column of the FID. The file actual data is composed of an area A (additional information+N_TSPs) and an area B (moving picture information). Allocation descriptors A and B in the file entry refer to the area A (additional information+N_TSPs) and the area B (moving picture information), respectively. Thereby, the two areas A and B are managed as one file. The UDF standard defines an effective data size of the area A (additional information+N_TSPs) as an integer multiple of a logical sector size. As for the area B including an end portion of the file, an effective data size is defined as arbitrary.

FIG. 12 is a flow chart showing the recording procedure of a disk camera in one shooting operation.

Initially, according to a recording starting operation by a user, the recording controlling part 1015 searches for the logical sector area B that can be used in the phase change optical disk 1008 (FIG. 10) and allows moving picture information to be recorded from a leading position of the area B (S1201). Further, in parallel with the recording of the moving picture information on the phase change optical disk 1008, at 1-minute intervals, a thumbnail image of 160 by 120 pixels is stored in a memory housed in the thumbnail image generating part 1017 (FIG. 10) (S1202). The thumbnail image corresponds to a variable data size portion of additional information, which changes in length with shooting time, and attribute information such as a shooting date and time corresponds to a fixed data size portion of the additional information.

For example, when shooting is finished in about 5 minutes, an area is detected that allows recording of additional information composed of attribute information such as a shooting date and time, and five thumbnail images, and the N_TSPs to be added behind the additional information (S1203). Then, the additional information is recorded in the area A (S1204). After that, a chunk of the N_TSPs having a sufficient length is added just behind the additional information (S1205).

Next, in the file entry, the allocation descriptor A (FIG. 11) is set to refer to the additional information and the N_TSPs, and the allocation descriptor B is set to refer to the moving picture information. The file entry thus is created, and the FID (FIG. 11) that refers to the file entry also is created (S1206). In this manner, the procedure of creating one file on the phase change optical disk 1008 is finished (S1207).

In the procedure, the thumbnail images included in the additional information are changed in size to 160 by 120 pixels, for example, by reducing a given field of a video image.

Furthermore, the additional information is used to refer to data stored in a VR_MANGR.IFO that is a file dedicated to additional information according to a video recording standard ver. 1.0 (September 1999) regarding DVD-RAMs. The additional information further is used to refer to Exif Attribute Information stored in an APP1 of a JPEG file according to an Exif standard ver. 2.1 regarding digital still cameras.

Moreover, a method also has been devised, in which additional information of a plurality of files is collected physically and arranged in a given recording area so as to be read collectively at a time, thereby reducing read time with respect to the additional information of the plurality of files. For example, when retrieving additional information with respect to a plurality of files, with additional information arranged collectively, a retrieving operation can be started by collectively reading an area in which the additional information is arranged without a seeking operation performed by a pickup.

In a conventional recording method employing a data structure shown in FIG. 9, a useless area including meaningless data is required, which is composed of the N_TSPs and has a maximum length of about 94 kbytes and an average length of 47 kbytes. Therefore, for example, supposing that 100 moving picture files of about 48 seconds on an average are created at a recording rate of 1.5 Mbps on an optical disk having a recording capacity of 1 Gbytes, it is necessary to create the N_TSPs having a total length of 9.4 Mbytes maximum. That is, an area accounting for 1% of a total recording capacity of the optical disk becomes useless.

DISCLOSURE OF THE INVENTION

With the foregoing in mind, it is an object of the present invention to provide an information recording apparatus and an information recording method, in which when additional information and moving picture information are managed as one file and recorded, a useless area that is irrelevant to information to be recorded is minimized, thereby allowing recording capacity to be used effectively, and an information recording medium recorded by using the apparatus and the method.

Another object of the present invention is to provide an information recording apparatus and an information recording method, in which while a useless area is minimized, additional information and moving picture information can be recorded in separate areas, respectively, and an information recording medium recorded by using the apparatus and the method. According to this configuration, there can be provided an information recording apparatus and an information recording method that can realize, while minimizing a useless area, collective arrangement of additional information and an increase in access speed with respect to additional information of a plurality of files, and an information recording medium recorded by using the apparatus and the method.

In order to achieve the aforementioned objects, a first aspect of an information recording apparatus of the present invention includes a recording controlling part that records, in a logical block of a recording medium, at least one of input video and audio information in a packet format of a fixed length that is different from a data size of the logical block, and creates a data file for recording, in the logical block, additional information with respect to the video or audio information in the packet format of the fixed length. The recording controlling part arranges, in each data file, a fixed data size portion of the additional information in an area ahead of an area in which the video and audio information are arranged, and a variable data size portion of the additional information in an area behind the area in which the video and audio information are arranged.

In order to achieve the aforementioned objects, a second aspect of the information recording apparatus of the present invention includes a recording controlling part that records, in a logical block of a recording medium, at least one of input video and audio information in a packet format of a fixed length that is different from a data size of the logical block, and creates a data file for recording, in the logical block, additional information with respect to the video or audio information in the packet format of the fixed length. The recording controlling part arranges, in each data file, the additional information in an area behind an area in which the video and audio information are arranged.

In order to achieve the aforementioned objects, a third aspect of the information recording apparatus of the present invention includes a recording controlling part that records, on a recording medium, at least one of input video and audio information in an MPEG transport stream format, and creates a data file for recording, on the recording medium, additional information with respect to the video or audio information in the MPEG transport stream format. The recording controlling part allows the video and audio information and the additional information to be recorded by arranging, in each data file, a fixed data size portion of the additional information in an area ahead of an area in which the video and audio information are arranged, and a variable data size portion of the additional information in an area behind the area in which the video and audio information are arranged.

In order to achieve the aforementioned objects, a fourth aspect of the information recording apparatus of the present invention includes a recording controlling part that records, on a recording medium, at least one of input video and audio information in the MPEG transport stream format, and creates a data file for recording, on the recording medium, additional information with respect to the video or audio information in the MPEG transport stream format. The recording controlling part allows the video and audio information and the additional information to be recorded by arranging, in each data file, the additional information in an area behind an area in which the video and audio information are arranged.

In order to achieve the aforementioned objects, a fifth aspect of the information recording apparatus of the present invention includes a recording controlling part that records continuously with respect to a logical block of a recording medium, at least one of input video and audio information in a packet format of a fixed length that is different from a data size of the logical block, and creates a data file for recording with respect to the logical block, additional information with respect to the video or audio information in the packet format of the fixed length. The recording controlling part arranges a dummy packet bridging a logical block boundary so that the dummy packet is interposed between an area of the additional information and an area of the video and audio information.

In the first and third aspects of the information recording apparatus, preferably, the recording controlling part further arranges a dummy packet bridging a logical block boundary so that the dummy packet is interposed between the area of the fixed data size portion and the area of the video and audio information, or between the area of the video and audio information and the area of the variable data size portion.

Further, in the second and fourth aspects of the information recording apparatus, preferably, the recording controlling part further arranges a dummy packet bridging a logical block boundary so that the dummy packet is interposed between the area of the additional information and the area of the video and audio information.

In order to achieve the aforementioned objects, a first aspect of an information recording method of the present invention includes the steps of: inputting at least one of video and audio information; recording, in a logical block of a recording medium, the input video and audio information in a packet format of a fixed length that is different from a data size of the logical block; recording with respect to the logical block, a fixed data size portion of additional information with respect to the video or audio information in the packet format of the fixed length in an area ahead of an area in which the video and audio information are recorded; and recording with respect to the logical block, a variable data size portion of the additional information in the packet format of the fixed length in an area behind the area in which the video and audio information are recorded.

In order to achieve the aforementioned objects, a second aspect of the information recording method of the present invention includes the steps of: inputting at least one of video and audio information; recording, in a logical block of a recording medium, the input video and audio information in a packet format of a fixed length that is different from a data size of the logical block; and recording with respect to the logical block, additional information with respect to the video or audio information in the packet format of the fixed length in an area behind an area in which the video and audio information are recorded.

In order to achieve the aforementioned objects, a third aspect of the information recording method of the present invention includes the steps of: inputting at least one of video and audio information; recording, on a recording medium, the input video and audio information in the MPEG transport stream format; recording a fixed data size portion of additional information with respect to the video or audio information in the MPEG transport stream format in an area ahead of an area in which the video and audio information are recorded; and recording a variable data size portion of the additional information in the MPEG transport stream format in an area behind the area in which the video and audio information are recorded.

In order to achieve the aforementioned objects, a fourth aspect of the information recording method of the present invention includes the steps of: inputting at least one of video and audio information; recording, on a recording medium, the input video and audio information in the MPEG transport stream format; and recording additional information with respect to the video or audio information in the MPEG transport stream format in an area behind an area in which the video and audio information are recorded.

In order to achieve the aforementioned objects, a fifth aspect of the information recording method of the present invention includes the steps of: inputting at least one of video and audio information; recording continuously with respect to a logical block of a recording medium, the input video and audio information in a packet format of a fixed length that is different from a data size of the logical block; recording with respect to the logical block, additional information with respect to the video or audio information in the packet format of the fixed length; and arranging a dummy packet bridging a logical block boundary so that the dummy packet is interposed between an area of the additional information and an area of the video and audio information.

In first and third aspects of the information recording method, preferably, a dummy packet bridging a logical block boundary further is arranged so as to be interposed between the area of the fixed data size portion and the area of the video and audio information, or between the area of the video and audio information and the area of the variable data size portion.

Furthermore, in the second and fourth aspects of the information recording method, preferably, a dummy packet bridging a logical block boundary further is arranged so as to be interposed between the area of the additional information and the area of the video and audio information.

In order to achieve the aforementioned objects, a first aspect of an information recording medium of the present invention includes information recorded using the first to fifth aspects of the information recording apparatus.

In order to achieve the aforementioned objects, a second aspect of the information recording medium of the present invention includes information recorded using the first to fifth aspects of the information recording method.

According to the aforementioned aspects of the apparatus, method, and medium of the present invention, since additional information having a variable data size is recorded behind an area in which video and audio information are recorded, useless packets, which are required to secure continuity of packets due to size difference between a logical block of a recording medium and a fixed-length packet to be recorded, can be minimized in number. Thus, the total recording capacity of the recording medium can be used effectively.

Furthermore, while a useless area is minimized, additional information and moving picture information can be recorded in separate areas, respectively. Thus, while a useless area is minimized, additional information of a plurality of files can be arranged collectively, thereby allowing an increase in access speed with respect to the additional information of the plurality of files.

BEST MODE FOR CARRYING OUT THE INVENTION

Figure 10:
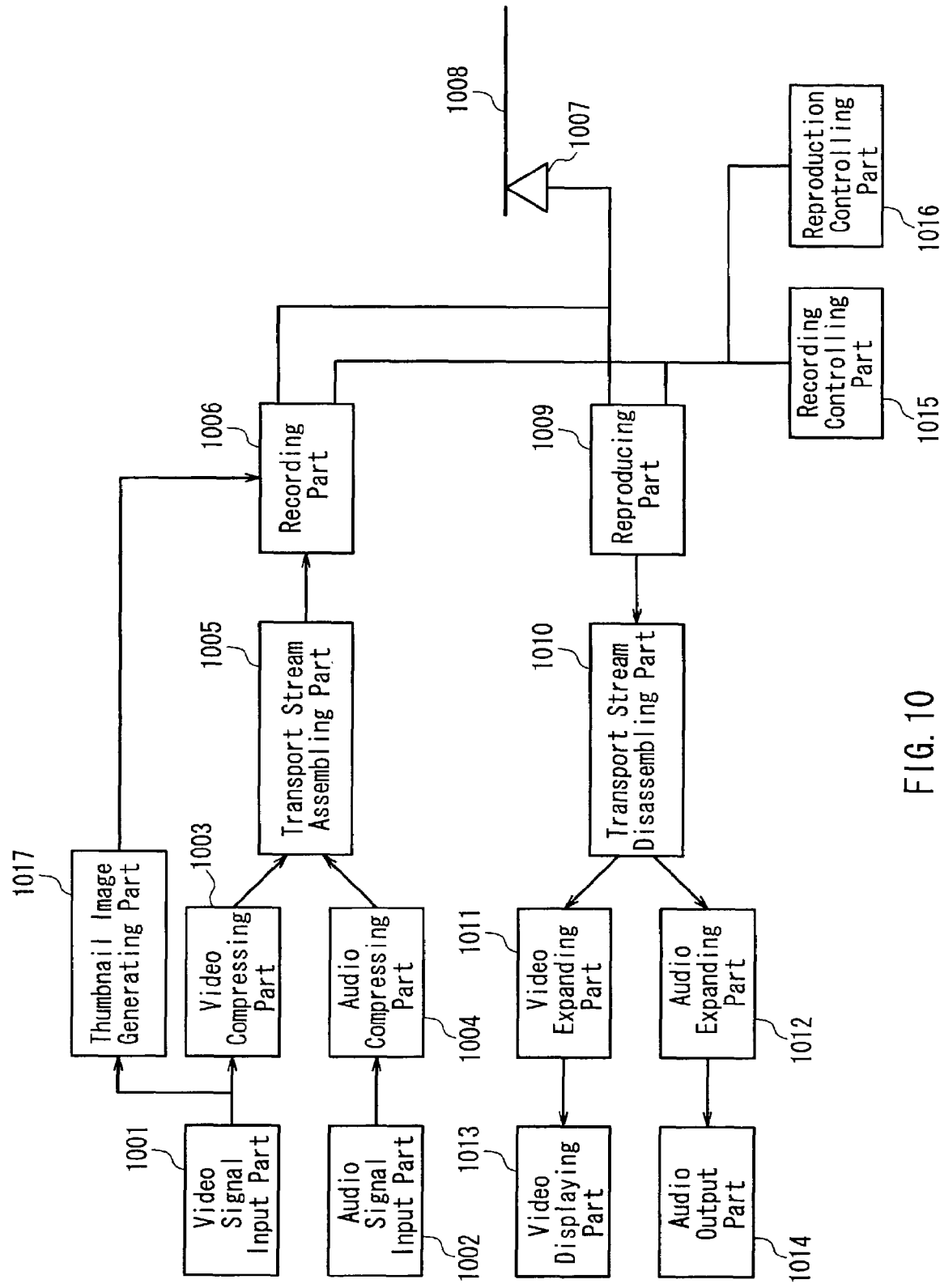
FIG. 10 is a block diagram showing a configuration of the conventional disk camera.
Figure 11:
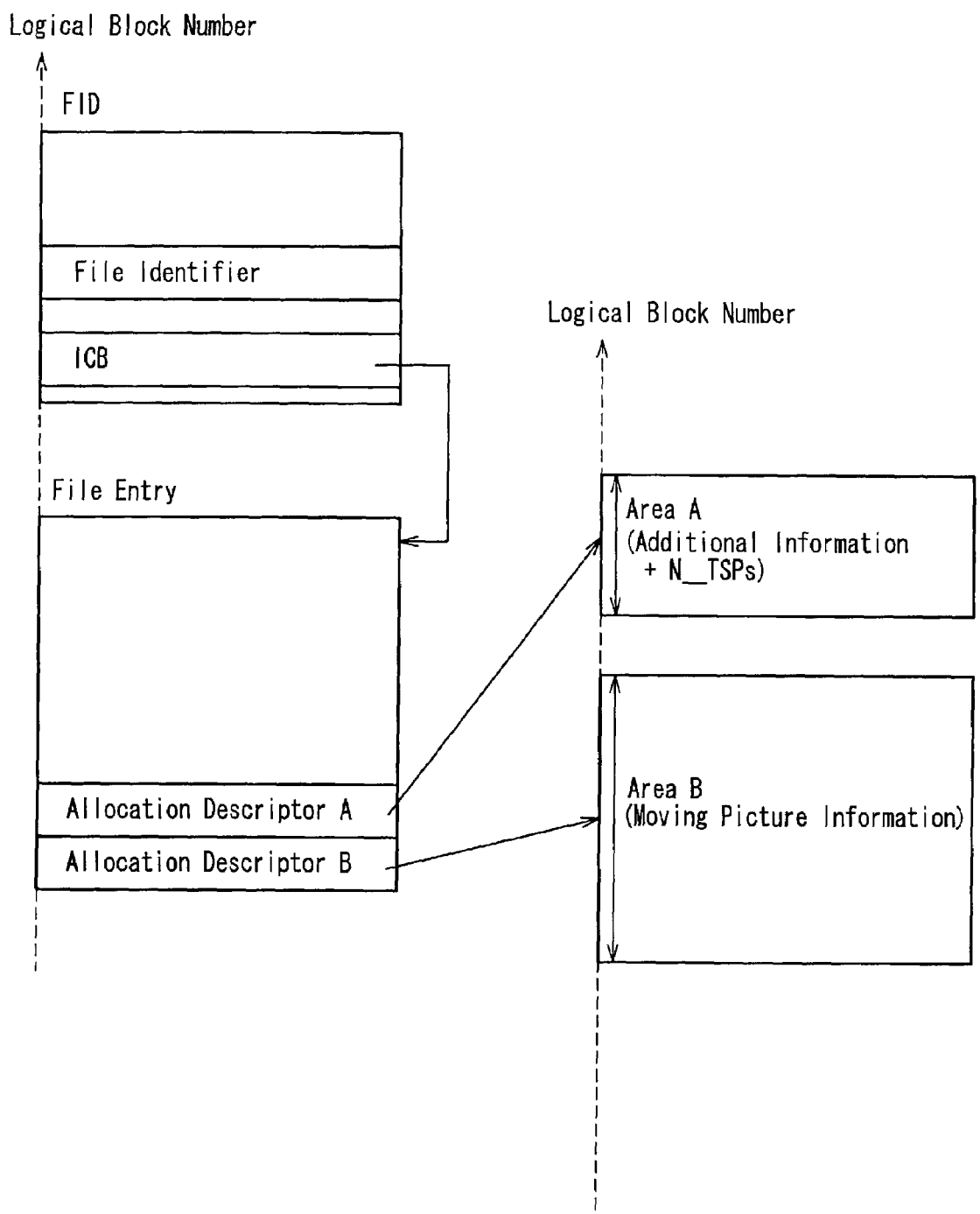
FIG. 11 is a diagram showing a data structure of the UDF file system in the conventional disk camera.
Figure 12:
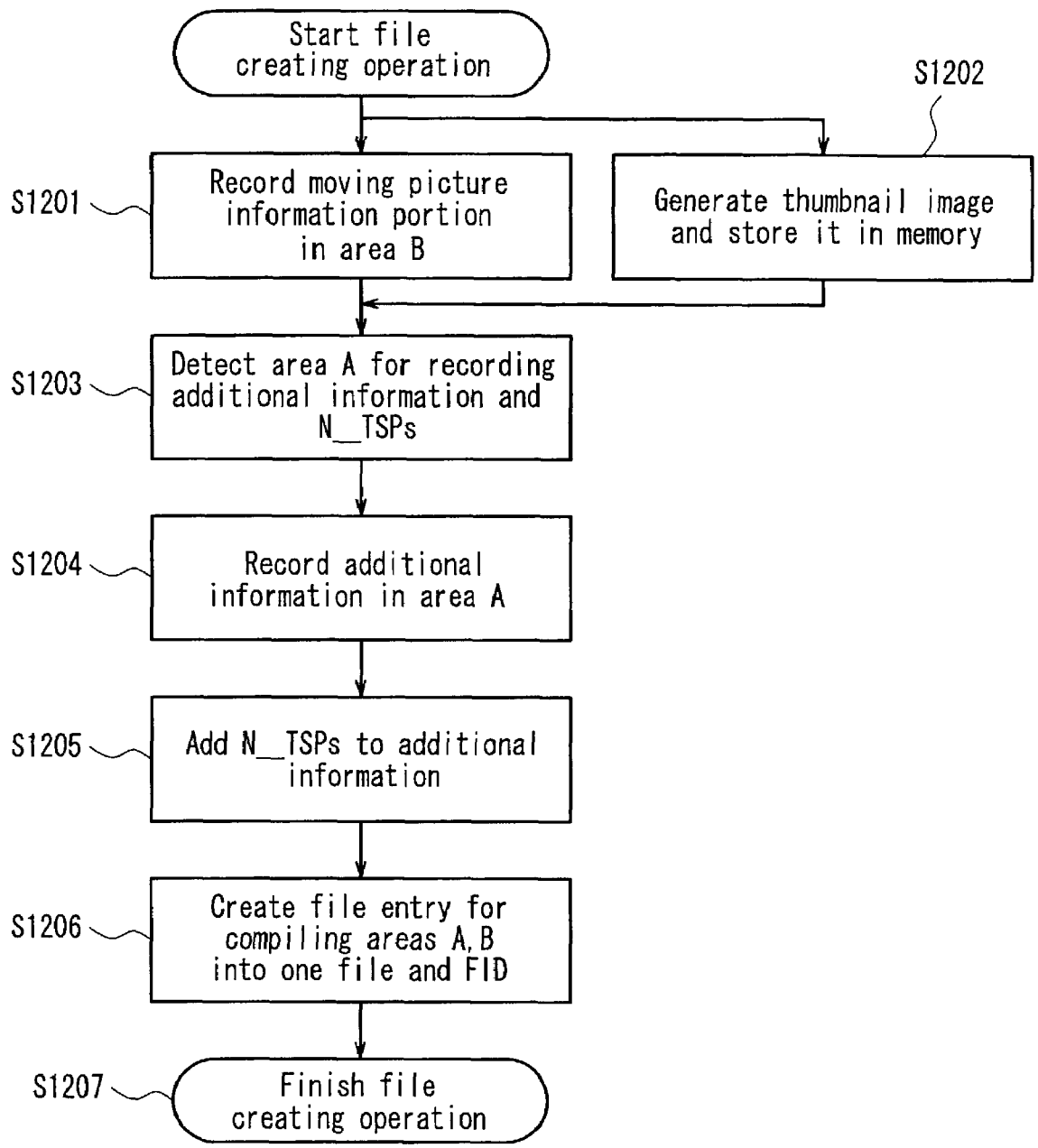
FIG. 12 is a flow chart showing a file creating procedure in the conventional disk camera.

Hereinafter, the present invention will be described by way of embodiments with reference to the appended drawings. It is assumed that a disk camera described in the following has the same block configuration as that shown in FIG. 10. However, in a disk camera of the present invention, a file creating function performed by the recording controlling part 1015 is different.

EMBODIMENT 1

Figure 1:
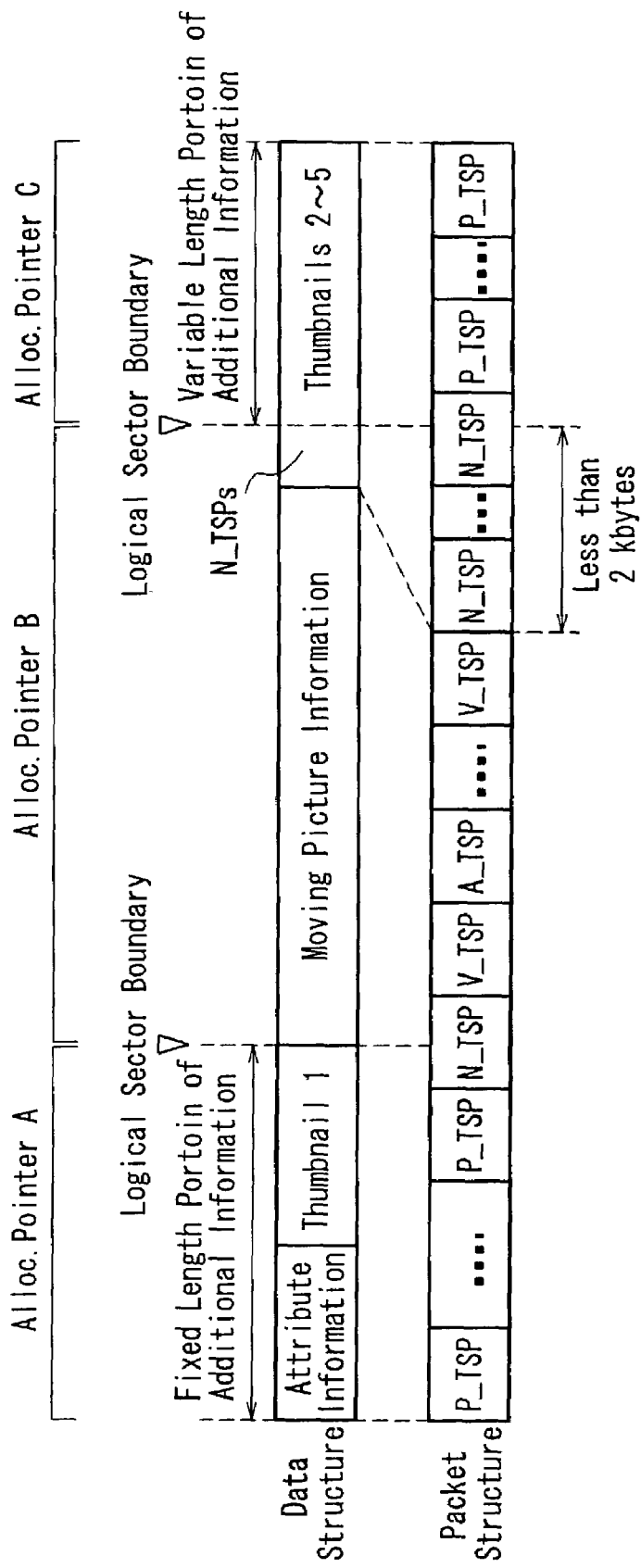
FIG. 1 is a diagram showing a data structure and a packet structure of a moving picture file according to Embodiment 1 of the present invention.

FIG. 1 is a diagram showing a data structure and a packet structure of a moving picture file according to Embodiment 1 of the present invention. In this embodiment, additional information is divided into a fixed length portion and a variable length portion. The fixed length portion and the variable length portion are arranged in a format of a transport packet of a private stream, i.e. a P_TSP ahead of and behind moving picture information, respectively. The fixed length portion of the additional information is composed of attribute information and one thumbnail image (thumbnail 1) and has a constant and fixed data size that is an integer multiple of 2 kbytes. As for the variable length portion of the additional information, in FIG. 1, a configuration is shown as an example, in which the variable length portion is composed of four thumbnail images (thumbnails 2, 3, 4 and 5). Further, the thumbnail image is created at 1-minute intervals and increased in number in proportion to shooting time.

Furthermore, on a boundary between the fixed length portion of the additional information and the moving picture information, one null transport packet, i.e. a N_TSP is arranged so as to bridge the boundary. Further, in a portion following an end portion of the moving picture information, a plurality of the N_TSPs are arranged from the end portion to a logical sector boundary occurring first in the portion following the end portion. Since logical sectors have a data size of 2 kbytes, the data size of the plurality of the N_TSPs is less than 2 kbytes. On a boundary between the plurality of the N_TSPs and the second thumbnail, one N_TSP is arranged so as to bridge the boundary.

Figure 2:
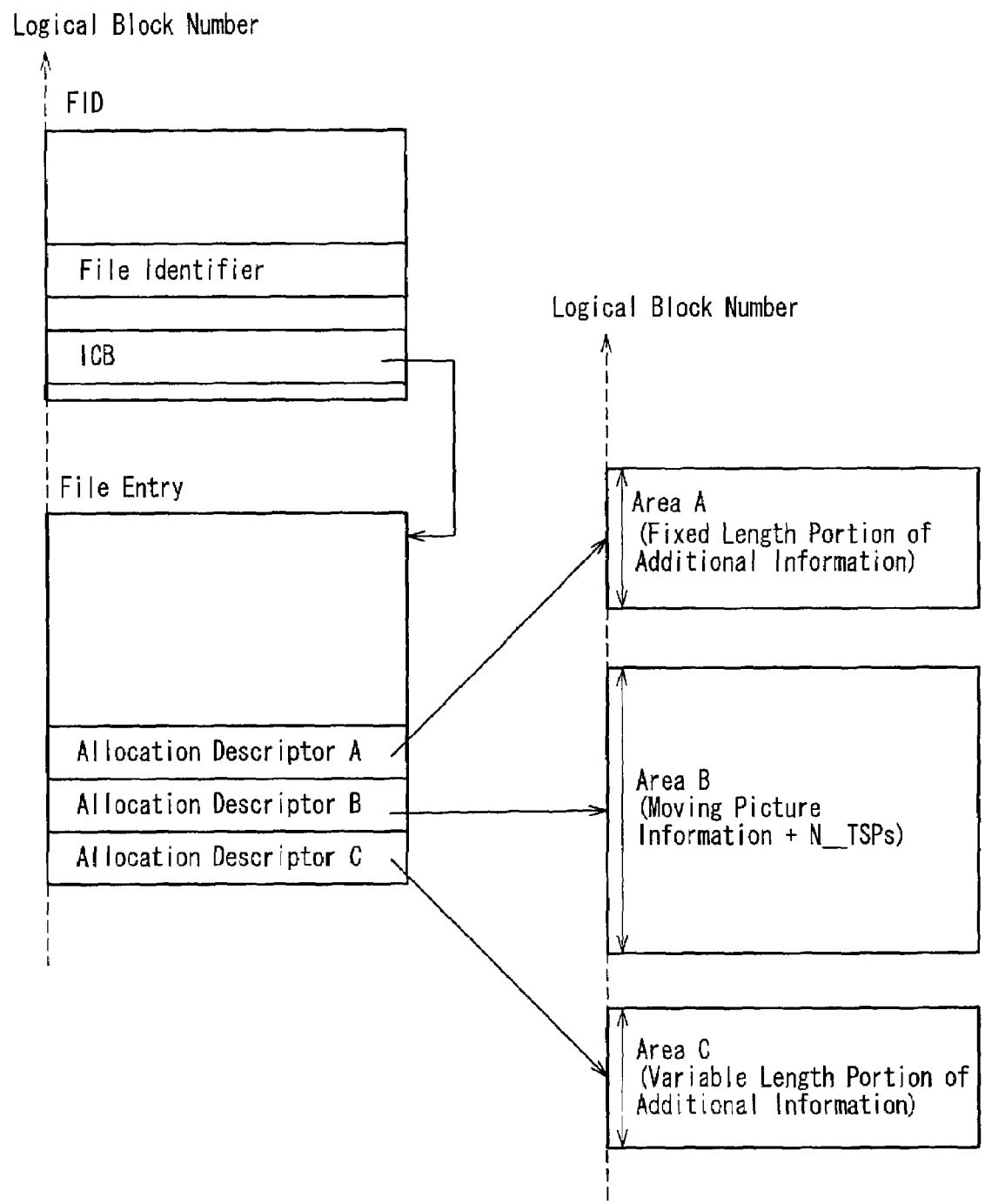
FIG. 2 is a diagram showing a data structure of the UDF file system in a disk camera according to Embodiment 1 of the present invention.

FIG. 2 shows how one moving picture file shown in FIG. 1 is managed using the UDF file system as an example. In the moving picture file, the fixed length portion of the additional information is recorded in an area A, the moving information and the plurality of the N_TSPs are recorded in an area B, and the variable length portion of the additional information is recorded in an area C. The area A (the fixed length portion of the additional information), the area B (the moving picture information and the plurality of the N_TSPs), and the area C (the variable length portion of the additional information) are referred to by three allocation descriptors A, B and C in a file entry, respectively, to be managed as one file. Further, the file entry is referred to by an FID to be managed.

Figure 3:
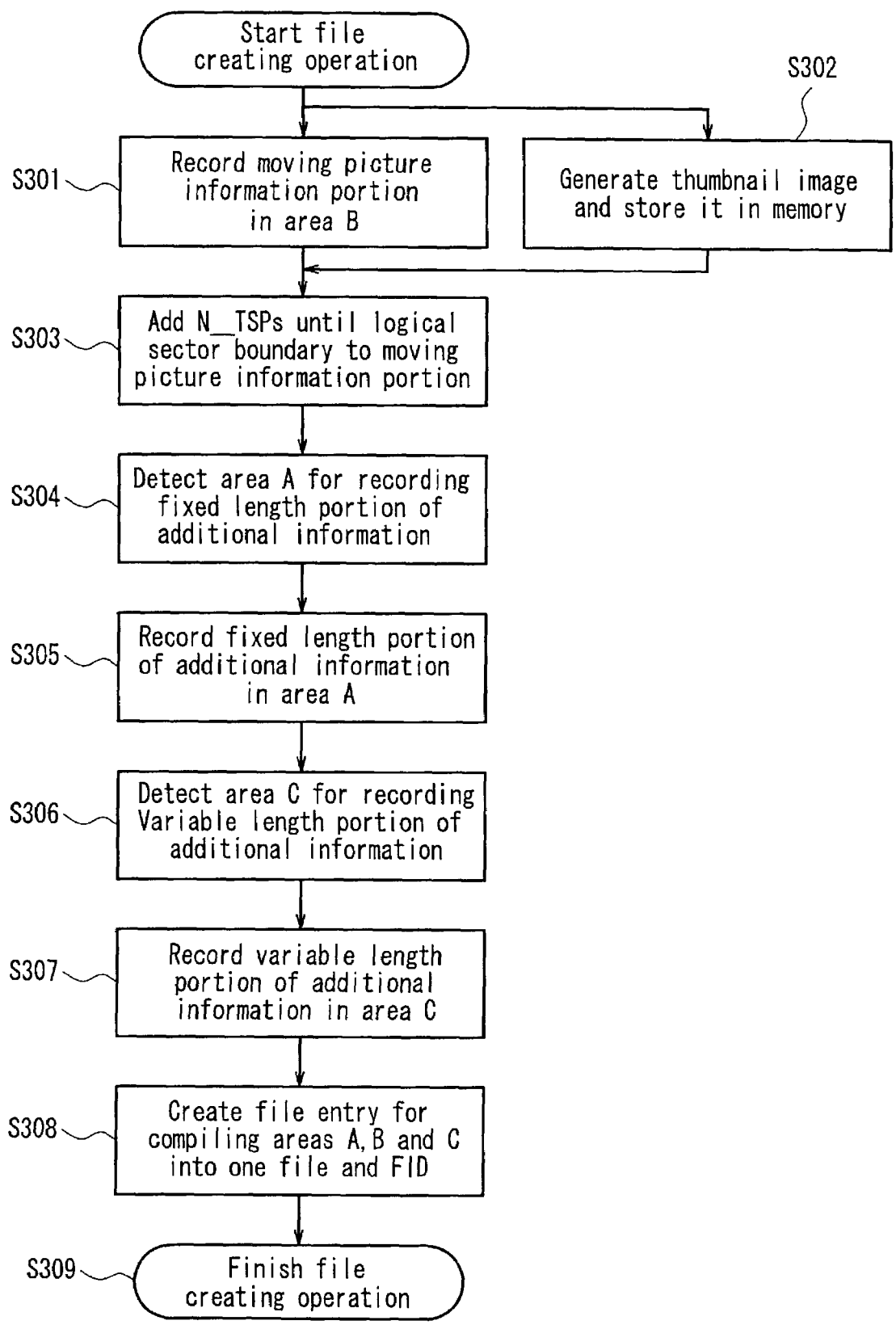
FIG. 3 is a flow chart showing a file creating procedure performed by a recording controlling part according to Embodiment 1 of the present invention.

FIG. 3 is a flow chart showing a file creating procedure performed by the recording controlling part 1015 according to this embodiment.

According to a recording starting operation by a user, initially, the recording controlling part 1015 starts recording the moving picture information from the area B (S301). In this recording, a leading portion of the moving picture information starts from a mid portion of the N_TSP as in the packet structure shown in FIG. 1. In parallel with the recording of the moving picture information, a thumbnail image is created at 1-minute intervals and stored in memory (S302). Then, according to a recording finishing operation by the user, the recording of the moving picture information and the creation of the thumbnail images are completed. After that, the plurality of the N_TSPs are added from the end portion of the moving picture information to a first occurring logical sector boundary (S303).

Next, in an optical disk, the area A for recording the fixed length portion of the additional information is detected (S304), and the fixed length portion of the additional information is recorded in the area A (S305). In this recording, in an end portion of the fixed length portion of the additional information, recording of the N_TSP is finished in a mid portion of the N_TSP as shown in FIG. 1.

Next, the area C for recording the variable length portion of the additional information is detected (S306), and the variable length portion of the additional information is recorded in the area C (S307). In this recording, since a shooting operation has been completed already, at the time of starting detection of the area C, the data size of the variable length portion of the additional information has been determined already. Further, recording of a leading data of the variable length portion of the additional information is started from a mid portion of the N_TSP as shown in FIG. 1.

Finally, the file entry for compiling the area A (the fixed length portion of the additional information), the area B (the moving picture information and the plurality of the N_TSPs), and the area C (the variable length portion of the additional information) into one file is created, and the FID that refers to the file entry also is created (S308), and thus the file creating procedure is finished (S309).

In the procedure, it is assumed that the areas A, B and C secure their respective areas so as to make logical blocks as continuous as possible.

When the fixed length portion of the additional information has a data size that is an integer multiple of 94 kbytes, the N_TSP bridging the boundary between the fixed length portion and the moving picture information is not required. Further, when a total value of the respective data sizes of the fixed length portion of the additional information and the moving picture information is an integer multiple of 2 kbytes, the N_TSPs between the moving picture information and the variable length portion of the additional information also are not required.

As described above, the recording controlling part 1015 performs the file creating procedure shown in FIG. 3, so that in a portion following an area in which the moving picture information is recorded, a useless area having a maximum length of 2,047 (=2,048−1) bytes only is required. The data size of the useless area depends on recording time. When the recording time varies evenly, the data size is 1 kbyte on an average. Therefore, assuming that 100 moving picture files of 48 seconds on an average are created at a recording rate of 1.5 Mbps on an optical disk having a recording capacity of 1 Gbytes, it is sufficient to create the N_TSPs having a total length of 0.2 Mbytes at most. That is, creation of the N_TSPs only requires about 0.02% of the total recording capacity of the optical disk.

Furthermore, by arranging the null transport packet on the boundary between the fixed length portion or the variable length portion of the additional information and the moving picture information, the fixed length portion, the variable length portion, and the moving picture information can be recorded in separate areas, respectively. With respect to a plurality of files, the fixed length portions of the additional information, the variable length portions of the additional information, and recording areas of the moving picture information can be collected in given areas, respectively. Thus, while a useless area is minimized in recording, reading speed with respect to each area can be increased.

In this embodiment, the variable length portion of the additional information was composed only of the thumbnail images. However, the variable length portion may include address information that supports random access with respect to frames of a moving picture. Further, there is no particular limit to information to be included in the variable length portion of the additional information.

In this embodiment, the fixed length portion of the additional information was composed of data having a fixed data size. However, data having a variable data size also can be employed as long as a maximum of the data size is determined.

In this embodiment, the variable length portion of the additional information started from a mid portion of the file. This hinders the determination of a starting address of the variable length portion of the additional information. However, by allowing the fixed length portion of the additional information to include leading address information of the variable length portion, the starting address of the variable length portion of the additional information can be determined easily.

In this embodiment, the area A for recording the fixed length portion of the additional information and the area B for recording the moving picture information were secured in separate areas, respectively. However, since the data size of the fixed length portion is predetermined, the area A and the area B also can be secured so that the area A and a leading logical block of the area B are continuous. In this case, while only the fixed length portions of the additional information of a plurality of files cannot be arranged collectively in a given area, a useless area can be minimized in recording.

In this embodiment, as the fixed length portion, the attribute information and the thumbnail image were recorded in one area, i.e. the area A. However, the attribute information and the thumbnail image also can be recorded in separate areas, respectively. This can be achieved by arranging a boundary between the attribute information and the thumbnail image in the same manner as in the case of the fixed length portion and the moving picture information. That is, the boundary between the attribute information and the thumbnail image is arranged so as to coincide substantially with the logical block boundary, and the null transport packet is arranged so as to bridge over the logical block boundary.

In this embodiment, the area B for recording the moving picture information and the area C for recording the variable length portion of the additional information were secured in separate areas, respectively. However, the area B and the area C may be secured so that the area B and a leading logical block of the area C are continuous. In this case, while only the additional information of a plurality of files cannot be arranged collectively in a given area, a useless area can be minimized in recording.

In this embodiment, the null transport packet was arranged on the logical block boundary. However, the boundary is not necessarily required to be on the logical block boundary. In this case, while the additional information of a plurality of files cannot be arranged collectively in a given area, a useless are can be minimized in recording.

EMBODIMENT 2

Figure 4:
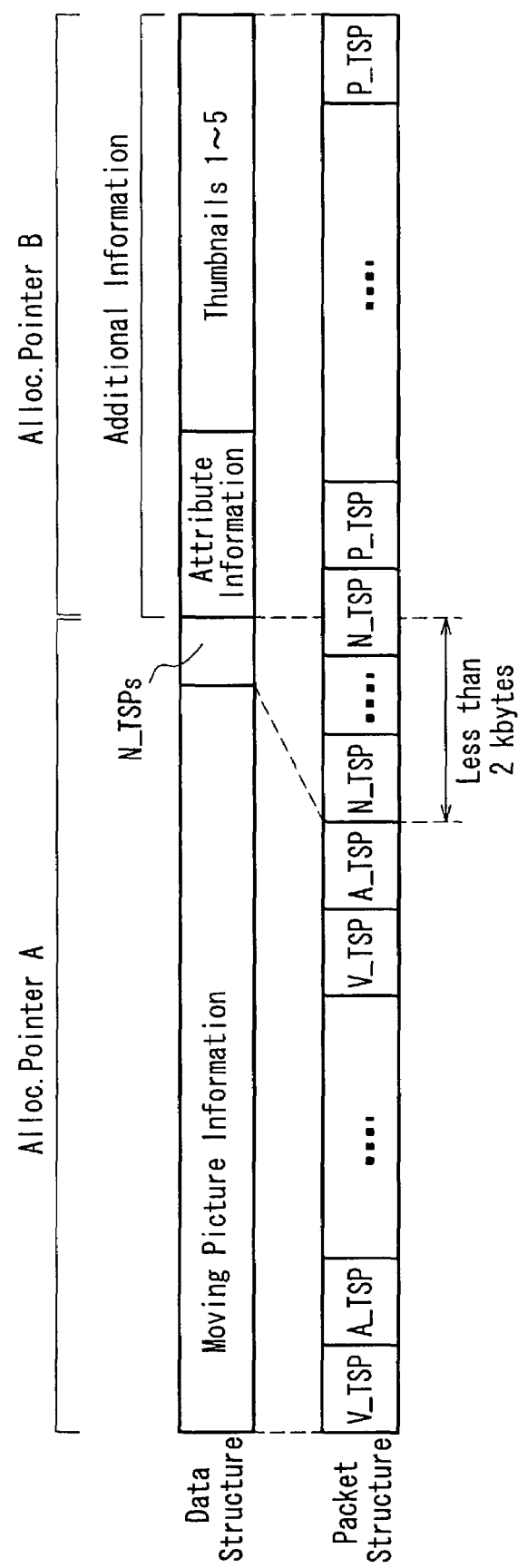
FIG. 4 is a diagram showing a data structure and a packet structure of a moving picture file according to Embodiment 2 of the present invention.

FIG. 4 is a diagram showing a data structure and a packet structure of the MPEG transport stream according to Embodiment 2 of the present invention. As shown in FIG. 4, in this embodiment, unlike the case of Embodiment 1, all additional information is recorded in a P_TSP format behind an area in which moving picture information is recorded. Further, as in Embodiment 1, the additional information is composed of attribute information and five thumbnail images. The additional information has a data size that increases as the number of the thumbnail images increases in proportion to shooting time. In a portion following an end portion of the moving picture information, a plurality of N_TSPs are arranged from the end portion to a logical sector boundary occurring first in the portion following the end portion. Since the logical sectors have a data size of 2 kbytes, the data size of the plurality of the N_TSPs is less than 2 kbytes. Further, on a boundary between the plurality of the N_TSPs added to the moving picture information and the additional information, one N_TSP is arranged so as to bridge the boundary.

Figure 5:
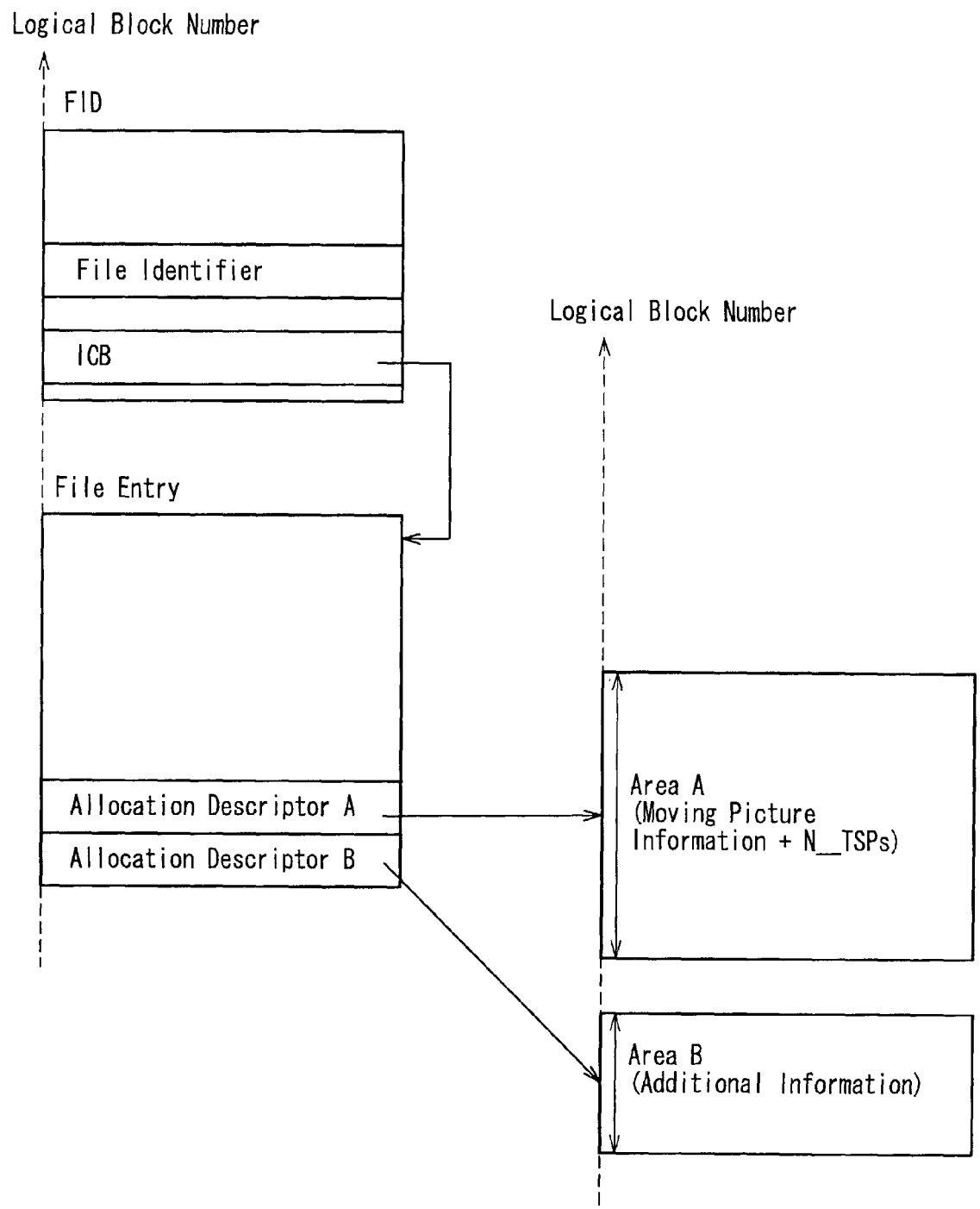
FIG. 5 is a diagram showing a data structure of the UDF file system in a disk camera according to Embodiment 2 of the present invention.

FIG. 5 shows how one moving picture file shown in FIG. 4 is managed using the UDF file system as an example. In the moving picture file, the moving picture information and the plurality of the N_TSPs are recorded in an area A, and the additional information is recorded in an area B. The area A (the moving picture information and the plurality of the N_TSPs) and the area B (a variable length portion of the additional information) are referred to by two allocation descriptors A and B in a file entry, respectively, to be managed as one file. Further, the file entry is referred to by an FID to be managed.

Figure 6:
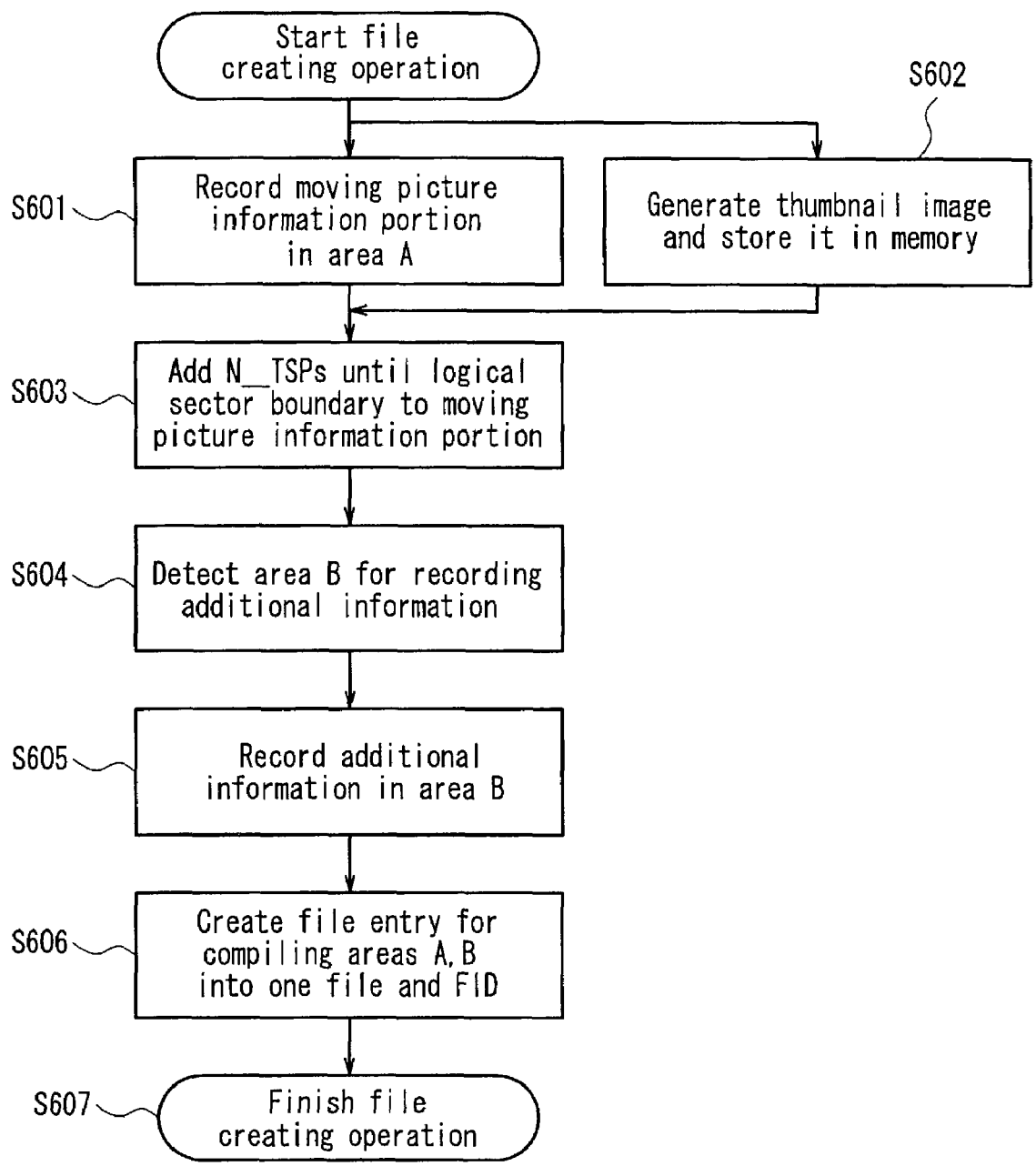
FIG. 6 is a flow chart showing a file creating procedure performed by a recording controlling part according to Embodiment 2 of the present invention.
Figure 7:
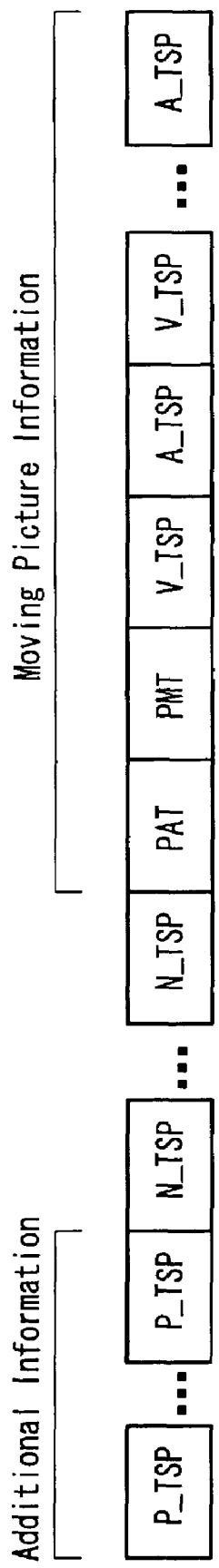
FIG. 7 is a diagram showing a packet structure of a moving picture file in a conventional disk camera.
Figure 8:
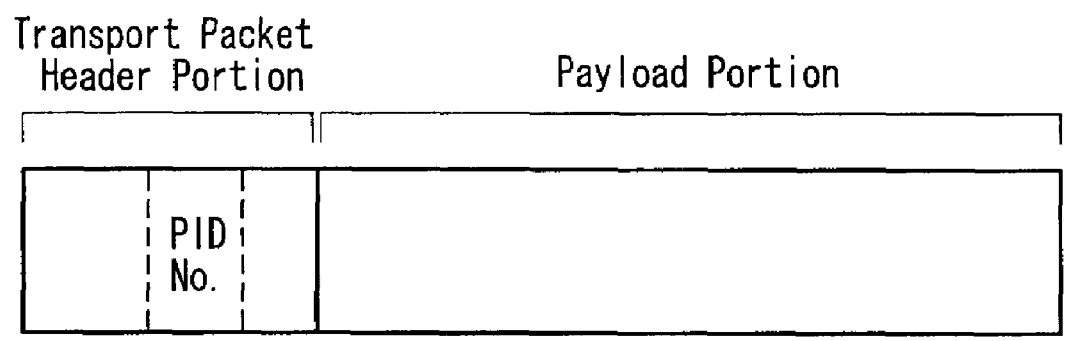
FIG. 8 is a diagram showing a data structure of the moving picture file in the conventional disk camera.
Figure 9:
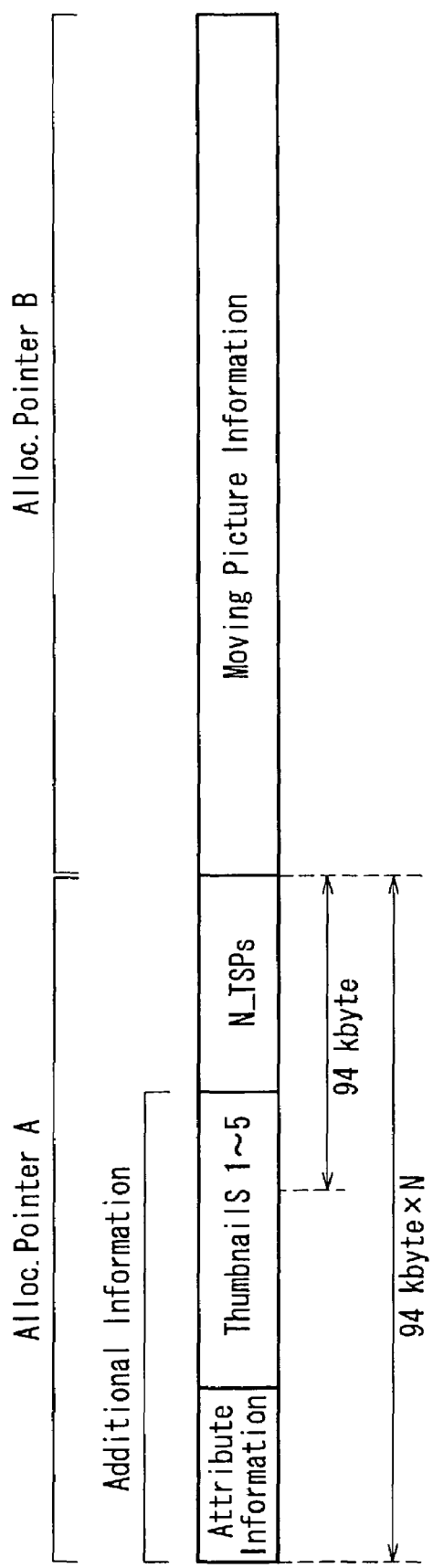
FIG. 9 is a diagram showing a data structure of a transport packet according to a conventional technique.

FIG. 6 is a flow chart showing a file creating procedure of the recording controlling part 1015 according to this embodiment.

According to a recording starting operation by a user, initially, the recording controlling part 1015 starts recording the moving picture information in the area A (S601). In this recording, a leading portion of the moving picture information corresponds to a leading portion of the file as in the packet structure shown in FIG. 4. In parallel with the recording of the moving picture information, a thumbnail image is created at 1-minute intervals and stored in memory (S602). Then, according to a recording finishing operation by the user, the recording of the moving picture information and the creation of the thumbnail images are completed. After that, the plurality of the N_TSPs are added from the end portion of the moving picture information to a first occurring logical sector boundary (S603). However, recording of the last N_TSP of the N_TSPs to be added is finished in a mid portion of the last N_TSP.

Next, the area B for recording the additional information is detected from unused areas (S604), and the additional information is recorded in the area B (S605). Since a data size of the additional information can be determined at the time of finishing the recording of the moving picture information, when detecting the area B, an unused area having the same data size as that of the additional information is detected. Further, leading data of the additional information starts from a mid portion of the N_TSP as shown in FIG. 4.

Finally, the file entry for compiling the area A (the moving picture information and the plurality of the N_TSPs) and the area B (the additional information) into one file is created, and the FID that relates to the file entry also is created (S606), and thus the file creating procedure is finished (S607).

In the procedure, it is assumed that the areas A and B secure their respective areas so as to make logical blocks as continuous as possible.

When the moving picture information has a data size that is an integer multiple of 94 kbytes, the N_TSPs are not required.

As described above, the recording controlling part 1015 performs the file creating procedure shown in FIG. 6, so that in a portion following an area in which the moving picture information is recorded, a useless area having a maximum length of 2,047 bytes only is required. The data size of the useless area depends on recording time. When the recording time varies evenly, the data size is 1 kbyte on an average. Therefore, assuming that 100 moving picture files of 48 seconds on an average are created at a recording rate of 1.5 Mbps on an optical disk having a recording capacity of 1 Gbytes, it is sufficient to create the N_TSPs having a total length of 0.2 Mbytes at most. That is, the creation of the N_TSPs only requires about 0.02% of the total recording capacity of the optical disk.

In this embodiment, as the additional information, the attribute information and the thumbnail images were recorded in one area, i.e. the area B. However, the attribute information and the thumbnail images also can be recorded in separate areas, respectively.

In this embodiment, the area A for recording the moving picture information and the area B for recording the additional information were secured in separate areas, respectively. However, the area A and the area B may be secured so that the area A and the leading logical block of the area B are continuous. In this case, while additional information of a plurality of files cannot be arranged collectively in a given area, a useless area can be minimized in recording. Moreover, in this case, it is not necessary further to provide the null transport packet.

In this embodiment, the null transport packet was arranged on the logical block boundary. However, the boundary between the moving picture information and the additional information is not necessarily required to be on the logical block boundary. In this case, while additional information of a plurality of files cannot be arranged collectively in a given area, a useless area can be minimized in recording. Moreover, in this case, it is not necessary further to provide the null transport packet.

In Embodiments 1 and 2, the disk camera was explained as an information recording apparatus. However, the disk camera merely was employed as an example, and the present invention is applicable to any apparatus such as a stationary video recorder and a personal computer, in which video and audio information are input to be recorded on an information recording medium.

In Embodiments 1 and 2, the phase change optical disk was explained as an information recording medium. However, the present invention is applicable to any disk-shaped information recording media including optical disks such as a DVD-RAM, an MO, a DVD-R, a DVD-RW, and a DVD+RW, and hard disks.

In Embodiments 1 and 2, the phase change optical disk was explained as an information recording medium. However, a semiconductor memory also can be employed. In this case, a FAT file system is employed in place of the UDF file system.

In Embodiments 1 and 2, the moving picture file was employed as a file. However, the file also can be composed of data in the form of a combination of a still picture and audio information as long as the data has an MPEG transport stream structure.

In Embodiments 1 and 2, the file was composed of the MPEG transport packets of 188 bytes in length. However, the file also can be composed of other types of packets as long as a logical sector and a packet are different in size.

In Embodiments 1 and 2, the additional information was stored in the private stream. However, the additional information also can be stored in a data structure of a private section according to an MPEG-2 system standard (ISO/IEC 13818-1). Further, the additional information also can be stored in other data structures set forth in Annex H of the MPEG-2 system standard.

Furthermore, the aforementioned configuration allows the additional information in a leading portion of a file to be reduced in size. As a result, when data recorded on the information recording medium of the present invention are read as a file using a disk drive for a personal computer so that an MPEG image is reproduced on a display of the personal computer, the data read time required to access to actual video information is shortened, thereby allowing delay time before starting reproduction to be shortened.

Moreover, the aforementioned configuration also provides the following advantage. That is, when creating a data file having a data structure described in Embodiment 1 or 2 using a personal computer or the like, the data file can be created more easily when variable length data is arranged in an end portion of the file than in a leading portion of the file. This is advantageous because when inserting variable length data ahead of video information, presumably, in some cases, the following procedural step is required: the video information is shifted backward so that the variable length data is inserted in an area thereby formed.

In Embodiments 1 and 2, the null transport packet was used as a dummy packet. However, the transport packet including a PID number dedicated to a dummy packet also may be used. Further, the transport packet may include a padding stream, a PES (Packetized Elementary Stream) packet dedicated to a dummy packet, a private section dedicated to a dummy packet, or stuffing data (stuffing bytes) in an adaptation field. Further, the transport packet may include any information that does not belong to either of the additional information and the moving picture information.

In Embodiments 1 and 2, the logical blocks in the additional information or the logical blocks in the moving picture information were made as continuous as possible. However, they are not necessarily required to be continuous. In this case, it is meant that the additional information is not arranged collectively. Further, as for the moving picture information, it is difficult to secure seamless reproduction (real time reproduction). This is because in some cases, due to a large amount of a seeking operation performed by an optical pickup or the like, data to be reproduced is lost.

In Embodiments 1 and 2, the logical blocks in the additional information and the logical blocks in the moving picture information were made as continuous as possible. However, this does not apply to the case where a defective logical block is present. Needless to say, in this case, the presence of the defective logical block is made negligible by employing an alternative logical block, or performing processes of, for example, skipping the defective logical block, as long as the number of occurrences of the defective logical block falls within a certain range.

In Embodiments 1 and 2, the logical blocks were made as continuous as possible. However, in the case of an optical disk, for example, as long as the amount of a seeking operation performed by an optical pickup can be reduced as much as possible, the logical blocks are not required to be continuous so much.

The invention claimed is:

1. A data recording apparatus comprising:
   a data input portion operable to input moving picture data; and
   a data recording portion operable to record information onto a recording medium, said data recording portion operable to:
   record the moving picture data to a first recording area;
   record first additional information of the moving picture data to a second recording area, the first additional information having a size no greater than a fixed length; and
   record second additional information of the moving picture data to a third recording area, the second additional information having a size with a variable length.

2. The data recording apparatus according to claim 1, wherein the first additional information comprises first thumbnail image data representing a thumbnail image of the moving picture data, and the second additional information comprises second thumbnail image data representing another thumbnail image of the moving picture data.

3. The data recording apparatus according to claim 1, wherein the first additional information, the moving picture data and the second additional information are disposed sequentially in a data stream.

4. The data recording apparatus according to claim 1, wherein the first, second and third recording areas, and the data contained therein, are compiled as one file on the recording medium.

5. A data recording method comprising:
   recording information onto a recording medium, said recording including:
   recording moving picture data to a first recording area;
   recording first additional information of the moving picture data to a second recording area, the first additional information having a size no greater than a fixed length; and
   recording second additional information of the moving picture data to a third recording area, the second additional information having a size with a variable length.

6. The data recording method according to claim 5, wherein the first additional information comprises first thumbnail image data representing a thumbnail image of the moving picture data, and the second additional information comprises second thumbnail image data representing another thumbnail image of the moving picture data.

7. The data recording method according to claim 5, wherein the first additional information, the moving picture data and the second additional information are disposed sequentially in a data stream.

8. The data recording method according to claim 5, wherein the first, second and third recording areas, and the data contained therein, are compiled as one file on the recording medium.

9. A computer-readable medium comprising:
   a first recording area containing moving picture data;
   a second recording area containing first additional information of the moving picture data, the first additional information having a size no greater than a fixed length; and a third recording area containing second additional information of the moving picture data, the second additional information having a size with a variable length.

10. The computer-readable medium according to claim 9, wherein the first additional information comprises first thumbnail image data representing a thumbnail image of the moving picture data, and the second additional information comprises second thumbnail image data representing another thumbnail image of the moving picture data.

11. The computer-readable medium according to claim 9, wherein the first additional information, the moving picture data and the second additional information are disposed sequentially in a data stream.

12. The computer-readable medium according to claim 9, wherein the first, second and third recording areas, and the data contained therein, are compiled as one file.

* * * * *